United States Patent

[11] 3,624,818

[72] Inventor Bradford O. Stanfield
9449 Grace St., Fontana, Calif. 92335
[21] Appl. No. 79,378
[22] Filed Oct. 9, 1970
[45] Patented Nov. 30, 1971

[54] REMOTE-CONTROLLED TRUCK MIRROR
3 Claims, 2 Drawing Figs.

[52] U.S. Cl...................................................... 350/289,
91/52, 92/13.4
[51] Int. Cl...................................................... G02b 5/08
[50] Field of Search............................................ 350/289,
299, 303, 304, 307; 74/501 M; 91/52; 92/13.4

[56] References Cited
UNITED STATES PATENTS

| | | | |
|---|---|---|---|
| 3,089,512 | 5/1963 | Julien............................ | 91/52 X |
| 3,480,355 | 11/1969 | Smith............................ | 350/289 |

Primary Examiner—David Schonberg
Assistant Examiner—John W. Leonard

ABSTRACT: A mirror which is controlled by the truck driver from the interior of the cab of the truck. This device includes an air or vacuum cylinder with a piston and rod on its interior which when actuated by a controlled valve will rotate the mirror from is normal position so that the driver will be able to keep the rear end of the trailer in constant view when backing up the vehicle.

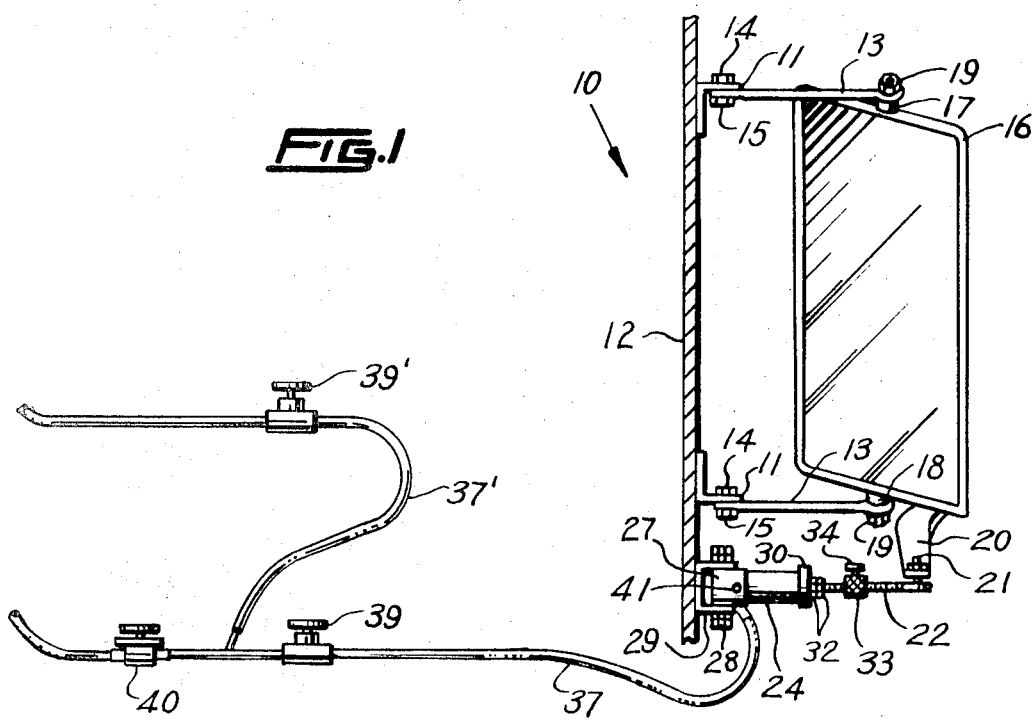
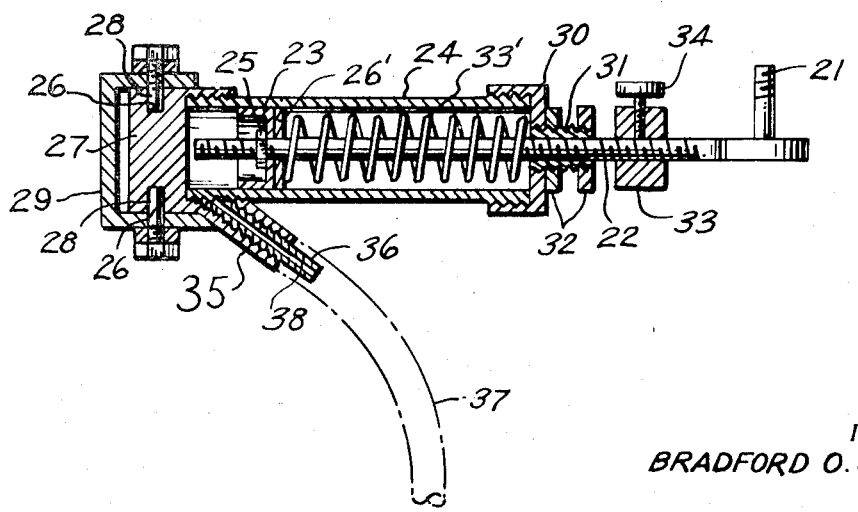
INVENTOR.
BRADFORD O. STANFIELD

REMOTE-CONTROLLED TRUCK MIRROR

This invention relates to vehicle mirrors and more particularly to a remote-controlled truck mirror.

It is therefore the primary purpose of this invention to provide a remote-controlled truck mirror which will be used in pairs, one on each side of the cab of the truck in order to allow the driver of the truck to have the rear end of the trailer in constant view, thus avoiding accidents.

Another object of this invention is to provide a truck mirror which will be pivotably mounted and will have arm means connected to the piston rod of an air or vacuum-actuated cylinder, the cylinder being mounted on the exterior of the cab of the truck.

Another object of this invention is to provide a truck mirror of the type described which will have a preset regulator valve within the air or vacuum line and will also have a control valve for actuating the air or vacuum cylinder, the piston of which will serve to rotate the mirror.

A further object of this invention is to provide a mirror which will have a stop adjustment sleeve on the piston rod which will limit the return travel of the rotation of the mirror, the mirror returning to its normal position by spring means contained within the actuating cylinder.

Other objects of the present invention are to provide a remote-controlled truck mirror which is simple in design, inexpensive to manufacture, rugged in construction, easy to use and efficient in operation.

These and other objects will become readily evident upon a study of the following specification together with the accompanying drawings wherein:

FIG. 1 is a perspective view of the present invention; and

FIG. 2 is an enlarged horizontal view of the air or vacuum operated cylinder, the structure being shown in elevation and in section.

According to this invention, a remote control truck mirror 10 is shown to include a pair of mounting brackets 11 which are L-shaped in configuration. The brackets 11 are secured in a suitable manner to the truck cab wall 12 and a pair of outwardly extending rods 13 are secured to brackets 11 by means of bolts 14 and nut fasteners 15. The mirror frame 16 is provided with pins 17 and 18 which are centrally mounted to the ends of frame 16. The pin 17, 18 slideably receive a nut fastener 19 but allow the mirror frame 16 to be freely rotatable between rods 13. An arm 20 is fixedly secured to the lower extremity of the mirror frame 16 and freely receives an upright pin 21 which extends from piston rod 22 carrying piston 23 within the actuating cylinder 24. A nut fastener 25 inserted onto the end of piston rod 22 thus secures piston 23 against a fixed disk 26' upon piston rod 22. A cap sleeve 27 inserted onto one end of the actuating cylinder 24 is provided with a pair of oppositely opposed openings 26 which freely receives the nonthreaded portion of a pair of bolts 28. Bolts 28 are threadingly carried within the mounting bracket 29 of actuating cylinder 24, the bracket 29 being secured in the well known manner to the truck cab wall 12. The opposite end of cylinder 24 is threadly received within an end cap 30 which receives an externally threaded bushing 31. Bushing 31 threadably receives a pair of locknuts 32 and the piston shaft 22 is free to oscillate within bushing 31. A knurled mirror stop adjustment nut 33 is carried upon the threaded piston shaft 22 and provides a means of limiting the return of piston rod 22 within cylinder 24, the adjustment nut 33 carrying a setscrew 34 for securing it in any desired position upon piston rod 22. A coiled spring 33' is carried on piston rod 22 within the confines of the cylinder 24 and provides return means for piston rod 22 in order that the mirror frame 16 will return to its normal position.

The cap sleeve 27 is provided with a hollow extending neck 35 which threadingly receives a fitting 36 which allows the air line 37 to be attached to the arrangement. The passageway 38 allows for the passage of air into cylinder 24 when the control valve 39 is opened by the driver. Secured in line 37 before the control valve 39, the preset regulator valve 40.

It shall be noted that a mirror similar to that shown is also secured to the opposite side of the truck, the arrangement being such that a air line 37' is branched off of line 37 behind the regulator valve 40 and between the control valve 39, the line 37' having a control valve 39' for actuating the second mirror when desired.

It shall be further noted that the cylinder 24 and its cap sleeve 27 are provided with a pair of aligned vent openings 41 which allow for the escape of air in order that the mirror frame 16 will return to its normal position.

When the driver is ready to back up the trailer he will rotate which ever control valve 39 or 39' is desired. When control valve 39 is opened, air is carried through line 37 and by means of passageway 38 is entered into cylinder 24 behind the piston 23. When this occurs the piston 23 is urged against the spring 33' and simultaneously urges piston rod 22 outwards and by means of the arm 20 will rotate the mirror frame 16. When cylinder 24 is in operation it is able to pivot by means of the bolts 28 carried within the openings 26 of the cap sleeve 27.

When the control valve 39 is closed by the driver, air is passed out of vent openings 41 when the spring urges piston 23 inwards towards the cap sleeve 27 and the travel is limited by means of the stop adjustment nut 33 which is set at any position desired upon the piston rod 22 by rotation.

What I now claim is:

1. A remote-control truck mirror comprising, an air-actuated cylinder, piston and rod means carried by said cylinder providing a means for rotating said mirror, arm means carried by said mirror for connecting said mirror to said rod means, first internally threaded cap sleeve means carried by said cylinder for closing off one end of said cylinder and a second internally threaded cap carried by said cylinder for closing off the opposite end of said cylinder, said second cap having a central hole permitting longitudinal movement of said rod means, mounting bracket means carried by said cylinder for holding it in position on a truck cab, spring means carried within said cylinder in compression between said piston and said second cap means providing return means for said mirror to its normal position, regulator valve and control valve means located remote from the mirror in the truck cab, an air line for carrying air from said valve means to said air-actuated cylinder for moving said piston toward said second cap against the action of said spring means, and an air vent valve including aligned openings in said cylinder and said first cap sleeve means to permit escape of air and allow the piston and thus the mirror to be returned to its normal position by action of said spring.

2. The combination according to claim 1, wherein said mirror is vertically mounted between a pair of outwardly extending rods, the rods being secured to brackets which are fastened to the cab wall of the truck, said rods being secured to said brackets by bolt and nut fasteners, and said mirror is provided with central pins at each end, said pins being received in said rods and held in place pivotably by suitable nut fasteners and one end of said mirror frame is provided with an offset and extending arm, said arm being freely carried upon an upright pin projecting from said piston rod, said pin being threaded at its outer extremity and receiving a suitable nut fastener.

3. The combination according to claim 2, wherein said piston rod travel inwards of said cylinder is limited by means of a stop adjustment nut threadingly carried upon the extending portion of said piston rod, and said stop adjustment nut allows said mirror to return to its normal position after being actuated, said nut being secured in a desired position by means of a setscrew threaded into said adjustment nut, said piston rod being slideably received in an externally threaded bushing, said bushing being threaded into said second cap of said cylinder and said bushing receiving a pair of locknuts.

* * * * *